US009032440B2

(12) United States Patent
Montvay et al.

(10) Patent No.: US 9,032,440 B2
(45) Date of Patent: May 12, 2015

(54) METHOD OF CONTROLLING THE PROGRAM SELECTION AT THE RECEIVER OF A BROADCAST MEDIUM

(75) Inventors: Andras Montvay, Stuttgart (DE); Martin Elixmann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 881 days.

(21) Appl. No.: 10/531,022

(22) PCT Filed: Oct. 9, 2003

(86) PCT No.: PCT/IB03/04486
§ 371 (c)(1),
(2), (4) Date: Apr. 12, 2005

(87) PCT Pub. No.: WO01/91458
PCT Pub. Date: Nov. 29, 2001

(65) Prior Publication Data
US 2006/0059516 A1    Mar. 16, 2006

(30) Foreign Application Priority Data
Oct. 17, 2002    (DE) .................................. 102 48 409

(51) Int. Cl.
*H04N 7/10*        (2006.01)
*H04N 21/466*     (2011.01)
*H04N 21/482*     (2011.01)
*H04N 7/16*        (2011.01)
(Continued)

(52) U.S. Cl.
CPC ....... *H04N 21/4661* (2013.01); *H04N 21/4826* (2013.01); *H04N 7/163* (2013.01); *H04N 21/25891* (2013.01); *H04N 21/44222* (2013.01); *H04N 21/4532* (2013.01); *H04N 21/454* (2013.01); *H04N 21/4668* (2013.01); *H04N 21/812* (2013.01); *H04H 60/33* (2013.01); *H04H 60/46* (2013.01)

(58) Field of Classification Search
CPC ............ H04N 21/482; H04N 21/4826; H04N 21/4821; H04N 21/4532
USPC ......................................... 725/61, 46, 44, 52
See application file for complete search history.

(56) References Cited

U.S. PATENT DOCUMENTS 5,748,259 A * 5/1998 Kang ............................ 348/634
5,812,123 A * 9/1998 Rowe et al. ..................... 725/43
(Continued)

FOREIGN PATENT DOCUMENTS

JP    2001333411 A    11/2001
JP    2002290996 A    10/2002
(Continued)

*Primary Examiner* — James R Sheleheda

(57) ABSTRACT

An interactive television application with watch lists is provided. The user may add programs such as television programs, Internet web pages, e-commerce applications, e-mail applications, and music channels, to a watch list. The user may also select a program from the watch list to watch it or to perform some other function related to that program. The interactive television application may display, under user control, watch lists that are overlaid over television programming, scaled so as not to obscure television programming, or on touch-screen remote controls. Programs may be added by the user to the watch lists at any time, or may be automatically added or removed by the interactive television application based on user preference profiles and reminder lists.

9 Claims, 2 Drawing Sheets

(51) Int. Cl.
*H04N 21/258* (2011.01)
*H04N 21/442* (2011.01)
*H04N 21/45* (2011.01)
*H04N 21/454* (2011.01)
*H04N 21/81* (2011.01)
*H04H 60/33* (2008.01)
*H04H 60/46* (2008.01)

(56) References Cited

U.S. PATENT DOCUMENTS

| | | | |
|---|---|---|---|
| 5,880,768 A * | 3/1999 | Lemmons et al. | 725/41 |
| 6,177,931 B1 * | 1/2001 | Alexander et al. | 725/52 |
| 6,317,881 B1 * | 11/2001 | Shah-Nazaroff et al. | 725/24 |
| 6,367,078 B1 | 4/2002 | Lasky | |
| 7,203,952 B2 * | 4/2007 | Broadus | 725/40 |
| 2002/0059610 A1 * | 5/2002 | Ellis | 725/58 |
| 2002/0083451 A1 | 6/2002 | Gill | |
| 2002/0199185 A1 * | 12/2002 | Kaminski et al. | 725/25 |
| 2003/0110501 A1 * | 6/2003 | Rafey et al. | 725/46 |
| 2003/0115603 A1 * | 6/2003 | Lemmons et al. | 725/53 |
| 2004/0049787 A1 * | 3/2004 | Maissel et al. | 725/46 |
| 2004/0123320 A1 * | 6/2004 | Daily et al. | 725/61 |

FOREIGN PATENT DOCUMENTS

| | | |
|---|---|---|
| WO | 9901984 A1 | 1/1999 |
| WO | 9917467 A1 | 4/1999 |
| WO | 0030350 A1 | 5/2000 |
| WO | 0120904 A1 | 3/2001 |
| WO | 0150742 A1 | 7/2001 |
| WO | WO 01/91458 A2 | 11/2001 |
| WO | 0193091 A1 | 12/2001 |

* cited by examiner

METHOD OF CONTROLLING THE PROGRAM SELECTION AT THE RECEIVER OF A BROADCAST MEDIUM

The invention relates to a method of controlling the program selection at the receiver of a broadcast medium, in which a list of preferred programs is managed in accordance with predetermined criteria. Furthermore, the invention relates to a receiver for a broadcast medium, comprising a processing unit for managing a list of preferred programs in accordance with predetermined criteria.

Broadcast media such as, for example, television or radio are characterized in that they transmit broadcasts in accordance with a fixed time plan and that a quasi-arbitrary number of users, not fixed in advance, can receive these broadcasts. Typically, broadcasts are transmitted in parallel on different channels of a broadcast medium, which channel broadcasts will hereinafter be referred to as "programs".

To manage the programs that can be received by a receiving apparatus such as, for example, a television or a radio and to enable the user to select the program in a convenient manner, different methods have been developed. For example, the management of the (complete) program survey in a numerically sorted channel list has been known for a long time. However, such lists are static and their sequence can usually only be changed by explicit user actions. This also applies to methods which have been further developed such as, for example, for satellite receivers in which the programs of a list can be grouped in accordance with program providers or in which the list can be completely edited on a computer.

Furthermore, radio receivers such as particularly car radios with an RDS system use automatic search tuning in which a list of, for example, six stations that have instantaneously the best reception are determined and assigned to station keys. Moreover, in RDS, a program selection in accordance with musical taste is also possible. To this end, the radio transmitter supplies information on whether preferably pop, classic music, country, etc. is played on the corresponding channel. However, such a classification does not take the instantaneously transmitted contents into account and is therefore unsuitable, particularly for "versatile" radio transmitters.

A method in which a list of preferred programs is automatically managed is known from WO 01/91458 A2. The list particularly comprises the entry of programs in the list or their removal from the list in accordance with predetermined user preferences. The latter may also be determined automatically by taking the times the user spends on a given program into account. In any case, however, the entry of a program in the list pre-supposes that the user has previously identified corresponding preferences explicitly or by way of his behavior.

It is therefore an object of the present invention to provide a method of controlling the program selection at the receiver of a broadcast medium, as well as an appropriately adapted receiver providing the possibility of a flexible program selection which is comfortable for the user and takes all potentially interesting programs into account.

This object is achieved by a method as defined in claim 1, a method as defined in claim 6, and by a receiver as defined in claim 9. Advantageous embodiments are defined in the dependent claims.

According to the invention, the method of controlling the program selection at the receiver of at least one broadcast medium is based on a list of preferred programs managed in accordance with predetermined criteria. To manage the list, entries of new programs are introduced and/or programs are removed. The method is characterized in that at least a part of said predetermined criteria is based on information about the program evaluation by other users of the broadcast medium.

While known methods of managing a list of preferred programs depend on explicit and/or implicit inputs by the relevant user as far as subjective selection criteria are concerned, the above-mentioned method provides a flexible and automatic management of a program list in accordance with subjective criteria without requiring input by the relevant user. To achieve this, the program evaluation is utilized which is gained (explicitly or implicitly) from other users of the broadcast medium. By definition, "other users" are those that do not use the receiver on which the method is performed. The method utilizes the characteristic feature of a broadcast medium in that the programs that are transmitted by this medium are simultaneously consumed by a more or less large number of users.

The program evaluation by other users, on which the method is based, may be gained, for example, from a (remote) enquiry of evaluation notes on the programs of interest. For example, the viewers of a television program may be requested by telephone to evaluate a current program, or they may themselves provide such an evaluation by telephone, e-mail, fax, SMS or the like. The evaluation notes thus obtained can be centrally collected and made available to a user within the scope of the method described. Another suitable and widely used method of program evaluation is to take the audience or viewer number for a current program into account. A high audience or viewer number indicates that the current program is most probably interesting to many users. It is exactly at this point where the proposed method is superior to the known methods which are only based on predetermined user preferences. For example, when in accordance with predetermined preferences, this user is not interested in sports or soccer, he may still be interested, by way of exception, in a particularly important soccer match such as the world championship final. By taking audience or viewer numbers into account, the relevant program can be entered into the program list without the user's intervention and against his actual preferences so that the user becomes aware of this program and does not miss it.

In addition to the criteria depending on the program evaluation by other users, further predetermined criteria can be taken into account for managing the list of preferred programs. Particularly, such further criteria may be based on information about:

the program provider, with, for example, services offered by the same provider as the one of the currently selected program may be interesting;

a description of the contents of the relevant program so that, for example, specific information or entertainment broadcasts can be entered into the list;

a (static or dynamic) evaluation of the program of a program provider, which information is particularly valuable when a program provider provides a plurality of programs in parallel and may therefore be evaluated differently;

explicitly predetermined user preferences, for example, by entering preferred actors, sports clubs, broadcast types, music directions, etc.;

implicitly gained or observed user preferences;

the position of a program in the list, which information is particularly significant for lists that are searched stepwise by way of what is called "zapping"; programs in the list that are far away from the currently selected program are to be preferably deleted;

the period of time elapsed since the last selection of a program, a long period of time indicating little preference for the relevant program which is thus pre-destined for deletion from the list;

the period of time the user stays with a given program, a long stay indicating a great preference for the program;

the period of time elapsed since the entry of a program in the list, in which this period of time together with the previously mentioned period of time since the last selection of a program and/or the staying time is preferably evaluated in combination. Particularly, the ratio of the period of time that the program is already in the list and the staying time can be computed, in which case a large value of this ratio indicates little preference for the program.

In accordance with a further embodiment of the method, the criteria used for managing the list are adaptively matched or weighted. Particularly, a criterion may be given a greater weight when a program entered into the list on the basis of this criterion is subsequently preferred by the user, i.e. when the selection and hence the used criterion is confirmed by the user's behavior. The weighting of different criteria may comprise the assignment of a weighted "zero" in the extreme case, which effectively corresponds to the deletion of the corresponding criterion.

In accordance with a preferred further embodiment of the invention, the user navigates stepwise through the list by way of control inputs. Typically, the user has two keys at his disposal, with which he can move the current selection from the list one position upwards or downwards in the list. Such a stepwise searching of programs in a list is also referred to as "zapping".

The invention also relates to a method of controlling the program selection at the receiver of at least one broadcast medium, in which a list of preferred programs is managed in accordance with predetermined criteria and in which control inputs enable a user to navigate stepwise through the list.

As explained above, stepwise navigation means that the selection from the list is moved one position upwards or downwards. The method is characterized in that a new program is added to the list when, upon navigation through the list, their limits are exceeded. This method is preferably combined with the above-mentioned method in which the program evaluation by other users is taken into account.

In the known method of managing a list of preferred programs, the stepwise navigation is performed cyclically, i.e. when the upper or lower end of the list has been reached and the user's entry indicates that he wants to search beyond this list, the selection will jump to the opposite (lower or upper) end of the list. In contrast to this, the list of a new program is added in the method according to the invention, in which automatically predetermined criteria are preferably evaluated. In this way, the user can quasi-arbitrarily extend his list without having to perform special actions or entries other than the usual browsing through the list.

In the case of stepwise navigation through the list of preferred programs, programs fulfilling a temporally limited negative criterion are preferably positioned at a distance from the current selection position in the list, which distance corresponds to the remaining duration of the negative criterion. Such a negative criterion may be a block of commercials which has been inserted in the program and which the user would like to skip. In accordance with the proposed method, the corresponding program is then repositioned in the list, i.e. it is moved further away from the currently selected program (selection position) as the duration of the commercial block is longer. In this way, it is achieved that, when zapping through the program, the user will most probably not reach the program with the commercials until after the negative criterion has been eliminated, i.e. until after the block of commercials has ended.

In accordance with a further embodiment of the method, information about a new program selected by a user from the list is supplied. Particularly, for example, short information about the basic broadcast interrupted by the block of commercials can be given during these commercials.

The invention also relates to a receiver for at least one broadcast medium, comprising a processing unit for automatically managing a list of preferred programs in accordance with predetermined criteria. The receiver is characterized in that the processing unit has an input for information signals relating to the program evaluation by other users of the broadcast medium, and in that at least a part of the predetermined criteria is based on said information signals. With such a receiver, the above-mentioned methods can be performed and their advantages can be achieved. The receiver may be further implemented in such a way that it can also perform the methods described hereinbefore.

The broadcast medium for the above-mentioned method or receiver may be particularly television or radio. These media are characterized by a very large number of parallel programs so that an intelligent support for managing and selecting the programs is particularly important to a user. The methods and the receiver may be particularly also used simultaneously in combination with different broadcast media so as to manage, for example, a common list of programs of the Internet radio and terrestrial radio.

These and other aspects of the invention are apparent from and will be elucidated with reference to the embodiments described hereinafter.

Figure 1:
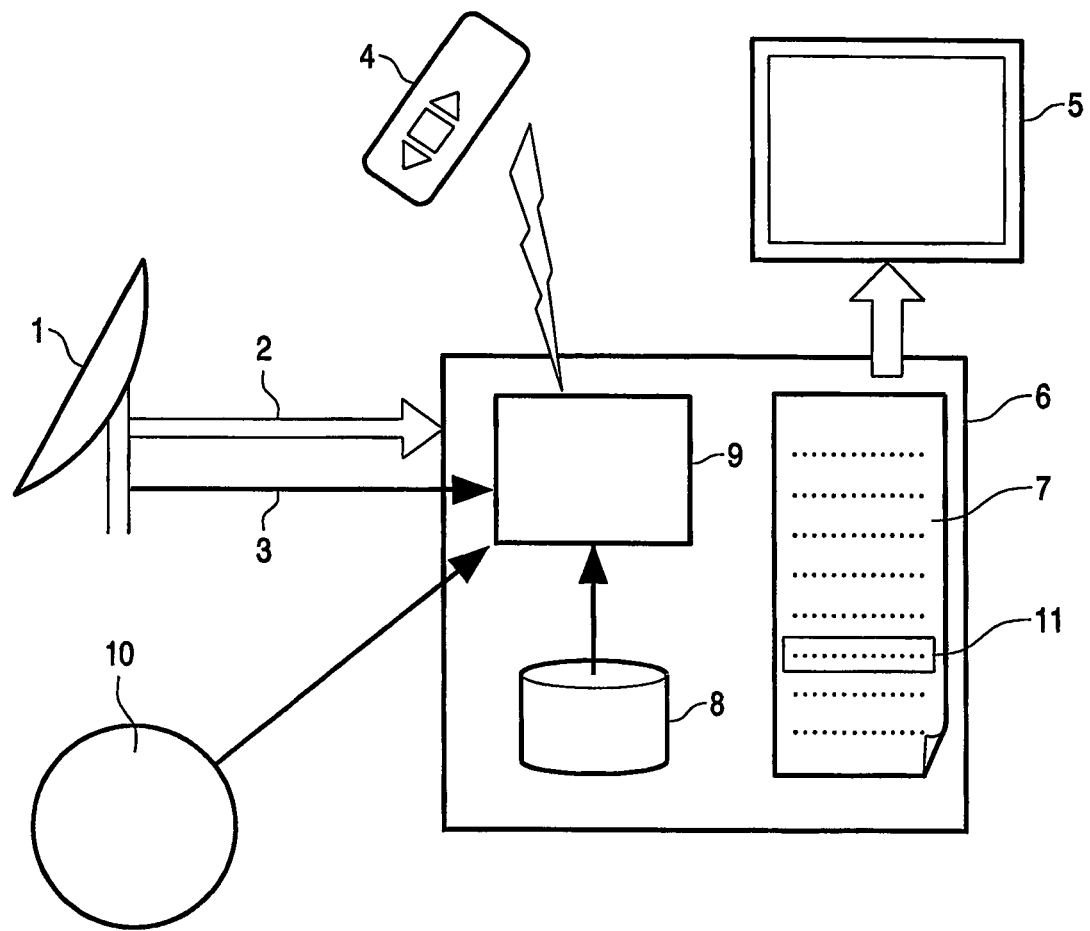
FIG. 1 shows the components of a receiver according to the invention.

The receiver 6 shown diagrammatically in FIG. 1 is coupled to a (satellite) antenna 1 from which it receives a program broadcast 2 as well as additional information 3. Furthermore, the receiver may be coupled to the Internet 10 so as to receive, for example, Internet radio. At the output, the receiver 6 is connected to a display such as, for example, a display screen 5 on which a currently selected program can be displayed. The system comprising antenna 1, receiver 6 and display screen 5 provides the possibility of receiving a broadcast medium such as particularly television or radio. A characteristic feature of such media is that hundreds of programs can often be received in parallel on different channels.

To support the user in the selection of the program from the numerous program supply, a list 7 is managed in the receiver 6, in which list preferred programs are assorted and stored in a given sequence. Typically, the user can transmit signals to the receiver 6 by means of a handheld remote control unit 4 so as to move the current selection 11 of a program stepwise one position up or one position down in the list. Such a sequential search of the list 7 in accordance with a sequence for finding an interesting program is referred to as "zapping".

Use of the list 7 essentially depends on the quality of the selection of programs. Typically, such lists are explicitly made by the user. Moreover, methods are known in which a processing unit 9 automatically manages the list 7 in the receiver 6 in accordance with predetermined criteria, for example, a stored user profile 8. However, the known method has the drawback that it requires information which is either static or made explicitly or implicitly available by the user.

According to the invention, to eliminate this drawback, the processing unit 9 managing the list 7 additionally receives information about a program evaluation by other users of the broadcast medium. Such additional information 3 can be transmitted from the antenna 1 to the processing unit 9, for example, in parallel with the program data 2. Similarly, additional information may, however, also be supplied to the processing unit 9 from other sources such as particularly the Internet 10. The typical method as described hereinafter is obtained when managing the list 7.

Initially, the list 7 managed by the processing unit 9 may be empty. At a later stage, the programs that were viewed last are memorized. With the zap keys on his handheld remote control 4, the user can navigate up and down through the list 7. In contrast to the typical behavior of a conventional list 7, which cyclically jumps to its other end when a (upper or lower end) has been reached, the processing unit 9 inserts a new program in the list 7 when the end of the list 7 has been reached. In this way, the user can quasi-arbitrarily extend the list without having to learn or perform special steps of operation.

When adding a new program, the processing unit 9 uses predetermined criteria so as to select the program which is most probably interesting to the user. To avoid excessive length of the list 7, the processing unit 9 may also remove programs from the list 7, possibly unnoticed by the user.

As already stated, the processing unit 9 may obtain the information for the criteria to be used for managing the list 7 from different sources, particularly from the broadcast medium via the additional information channel 3, from the Internet 10 or from a memory with a user profile 8. Information taken into account when adding a program to the list 7 may be, for example:

information about the evaluation of a program by other users of the broadcast medium. Such information may be particularly provided via the additional channel 3 or the Internet 10. For example, it may consist of active evaluations of programs by other users ("viewer ratings"), interactive polls and/or based on the current audience or viewer number of a program. When, for example, the user profile of a given person indicates that he is not interested in soccer, an exceptionally interesting soccer match (for example, the world championship final) may be entered into the list by taking the current number of viewers into account and because this soccer match is most probably also interesting to the person in question. A particularly strong aspect of the method is thus the evaluation of audience or viewer numbers and corresponding information in real time;
  the program provider whose offers other than the program just viewed may be interesting;
  program descriptions of the contents of each program;
  a static or dynamic, mutual evaluation, indicated by the program provider, of the programs or channels provided;
  user preferences 8 gained by explicit indication by the user (entering names of favorite actors, sports clubs, etc.) or by implicit observation, for example, of the periods of time the user watches or listens to programs. The implicit observation may particularly comprise the evaluation of the zapping behavior in the list 7.

Sources for the above-mentioned information may be particularly videotext/teletext, DVB-SI (Digital Video Broadcasting via Satellite), a database or the like.

Criteria or information preferably taken into account when deleting programs from the list 7 may be, inter alia:

a short period of time a user stays with the last selection of a program;
  the end of a broadcast that has run previously in a given program;
  changes of the above-mentioned positive selection information, for example, a decreasing number of viewers;
  the position of a program in the list 7 relative to the position 11 of the currently selected program ("zap distance"). In this case, programs that are far remote from the current selection 11 are preferably removed, whereas programs near the selection 11 are blocked from removal because their disappearance might irritate the user;
  the ratio between the period of time during which a program is already present in the list 7 and the time during which it was viewed for the last time or viewed in its entirety;
  the time the user stays with the instantaneously selected program 11. When the user watches the program 11, for example, for a long time and then starts zapping again after one hour, the old list 7 may have been canceled completely in the meantime.

An extension of the described system may be particularly a learning ability of the processing unit 9. For example, it can be investigated on what criterion a program was incorporated in the list 7 and how "successful" it subsequently was. The result may particularly indicate the frequency and duration of the time the user stays with the program and/or the period of time for which the program was entered in the list. The processing unit can then give a greater weight in future to criteria which, in accordance with this evaluation, have led to an apparently good program selection.

In accordance with another embodiment of the system, commercial breaks can be treated separately. For example, programs currently showing commercials can be suitably placed in the list 7 in such a way that the user punctually continues the actual broadcast again. Alternatively, a short intro to the actual broadcast is shown as an "appetizer" to the actual broadcast when selecting a program in which commercials are currently being displayed, whereupon the commercials are continued. Such an indication of an "appetizer" can be realized, for example, by corresponding buffering in a local storage medium, for which the program provider's intro for storage must be offered, for example, via the Internet.

Figure 2:
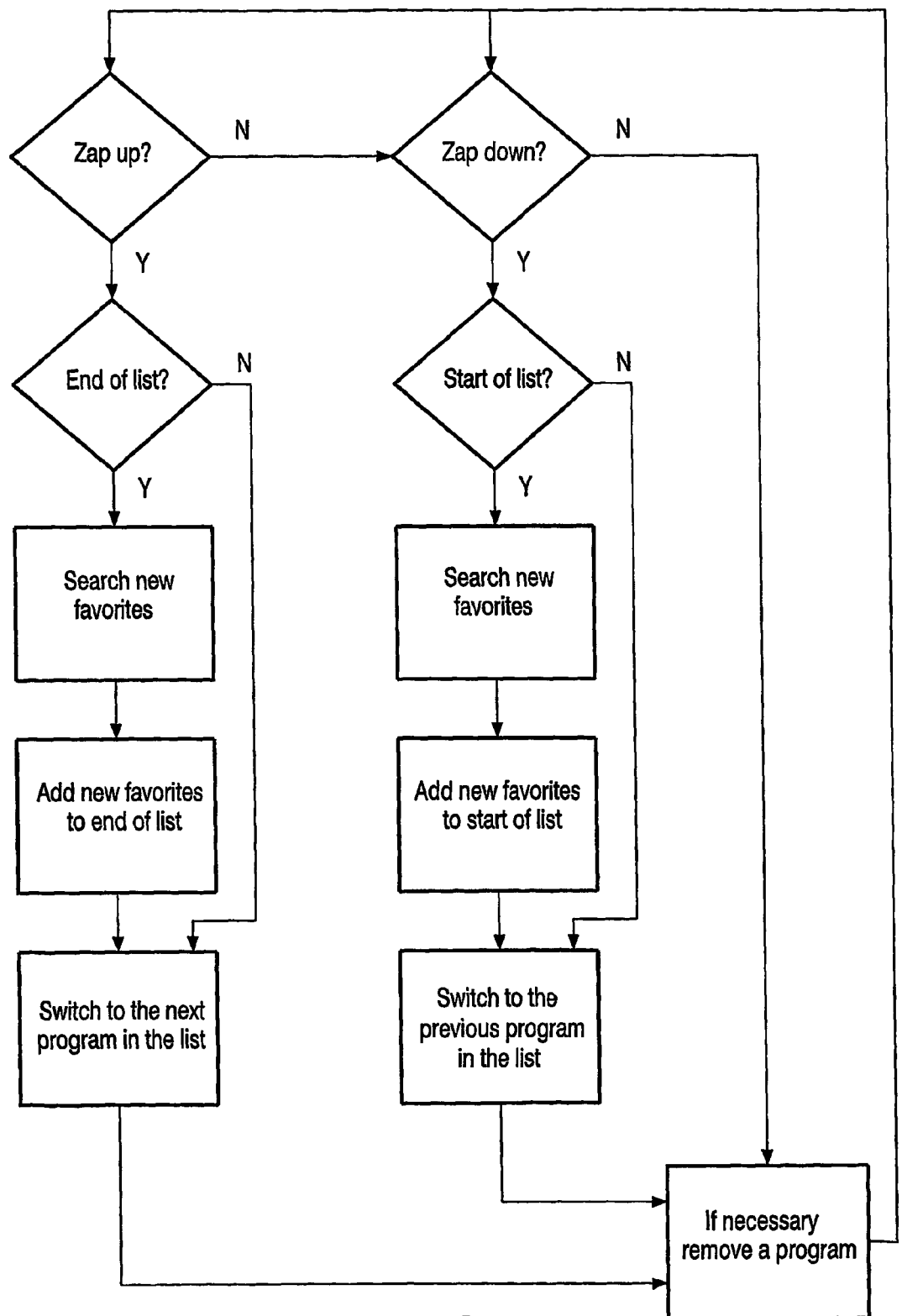
FIG. 2 is a flow chart showing the steps of the method performed when zapping through a list of preferred programs.

FIG. 2 is a flow chart of the steps of managing the list 7 by means of the processing unit 9 in response to moving the selection position one step up ("zap up") or one step down ("zap down") by actuating a key on the handheld remote control unit 4. This flow chart particularly shows that a new program is determined ("search new favorites") when reaching the lower end of the list or the start of the list and the list is added at the end or the start.

The following list of pseudo-program codes describes a corresponding algorithm for managing the list 7. The conventional list style such as particularly A:=[A,x] for appending an element x, A:=A/x for removing an element x are used.

```
list := { }
current := 0
repeat
    if button = zap-up then
        if current = length(list) then
            new_favorite = select_new( )
            list := [list, new_favorite]
        endif
        current := current + 1
    endif
    if button = zap-down then
        if current = 0 then
            new_favorite=select_new( )
```

```
                list := [new_favorite, list]
            else
                current := current − 1
            endif
        endif
        remove_some( )
    until button = off
end
function select_new( )
    others := complete_list_of_programmes( )\list
    bestscore := 0
    for every criterion from add_criteria
        candidate := find_best (others, criterion)
        if score(candidate,criterion) > bestscore then
            bestscore := score (candidate,criterion)
            best := candidate
        endif
    endfor
    return best
endfunction
procedure remove_some( )
    for every candidate from list
        penalty := 0
        for every criterion from remove_criteria
            if remove_veto(candidate,criterion)=true then
                goto next candidate
            endif
            penalty := penalty+score(candidate,criterion)
        endfor
        if penalty > threshold then
            list := list \ candidate
        endif
    endfor
endproc
```

To search a new program ("function select_new( )") a list of candidates is generated, which list is obtained from the overall list of programs with the exception of the programs already present in the list 7 and possibly also with the exception of the last n removed programs. Furthermore, there is a list of criteria in accordance with which programs are evaluated and it provides, for each criterion, an evaluation function which evaluates a program in accordance with this criterion and supplies a numerical score for it. Two typical methods are feasible:

a) the highest single score of a candidate is determined in a criterion, which candidate is the new favorite.

b) The candidate with the highest sum is determined from the scores via all criteria.

To remove programs ("procedure remove_some( )"), there is a list of criteria for removing programs, as well as an evaluation and a veto function for each of these criteria. For a selected program, the evaluation function indicates the degree of preference at which it should be removed, while the veto function indicates whether the program should definitely not be removed on the basis of this criterion (for example, because it is the instantaneously viewed program; it would be displayed in the veto function of the criterion "when viewed last"). The sum of all evaluation functions is determined for each program in the list. When this sum is beyond a predetermined limit (which may be dependent on, for example, the current length of the list 7), and when there is no veto by any criterion, the program is removed from the list 7.

LIST OF REFERENCE NUMERALS

1 satellite antenna
2 program broadcast
3 additional information
4 handheld remote control unit
5 display screen
6 receiver
7 program list
8 memory with user profile
9 processing unit
10 Internet
11 selection position in the list

The invention claimed is:

1. A method of controlling the program selection at the receiver of at least one broadcast medium, the method comprising the steps of:
    in a processor of the receiver,
    managing a list of preferred programs in accordance with predetermined criteria, and in which at least a part of the criteria is based on information about a program evaluation by other users of the broadcast medium,
    enquiring, separately, to at least one of the other users for input;
    allowing the user, using a control unit, to navigate through the list of preferred programs in accordance with the predetermined criteria; and
    wherein programs with content fulfilling a temporally limited criterion are positioned at a distance from a current navigation position in the list, which distance corresponds to a remaining duration of the criterion,
    wherein a program with content fulfilling a temporally limited criterion is a program containing a block of commercials and the program is positioned at a distance from the current navigation position in the list until the block of commercials has ended.

2. A method as claimed in claim 1, wherein the program evaluation is gained from an inquiry of evaluation notes by other users and/or from an audience or viewer number.

3. A method as claimed in claim 1, wherein at least a part of the predetermined criteria is based on information about:
    the program provider;
    a description supplied with the program;
    an evaluation of the program supplied by the program provider;
    explicitly predetermined user preferences;
    implicitly gained user preferences;
    the position of a program in the list;
    the period of time elapsed since the last selection of a program;
    the time a user stays with a program; and/or
    the period of time elapsed since the insertion of a program in the list.

4. A method as claimed in claim 1, wherein the criteria are weighted adaptively.

5. A method as claimed in claim 1, wherein control inputs enable a user to navigate stepwise through the list.

6. A method of controlling the program selection at the receiver of at least one broadcast medium, the method comprising the steps of:
    in a processor of the receiver,
    managing a a list of preferred programs, without requiring input by a user, in accordance with predetermined criteria, wherein at least a part of the criteria is based on information about a program evaluation by other users of the broadcast medium,
    enquiring, separately, to at least one of the other users for input, and
    allowing a user, using a control unit, to navigate stepwise through the list, wherein a new program is added to the list, when a limit of the list is exceeded by a user's navigating through the list,
    wherein programs with content fulfilling a temporally limited criterion are positioned at a distance from a current navigation position in the list, which distance corresponds to a remaining duration of the criterion, wherein a program with content fulfilling a temporally limited criterion is a program containing a block of commercials and the program is positioned at a distance from the current navigation position in the list until the block of commercials has ended.

7. A method as claimed in claim 1, wherein program information is supplied when a program is selected from the list.

8. A receiver for at least one broadcast medium, comprising a processor to manage a list of preferred programs, without requiring input by a user of the receiver, in accordance with predetermined criteria, wherein at least a part of the criteria is based on information about a program evaluation by other users of the broadcast medium, wherein the receiver includes a using a separate enquiry to at least one of the other users for input, wherein the processor has an input for information signals relating to the program evaluation by other users of the broadcast medium and wherein programs with content fulfilling a temporally limited criterion are positioned at a distance from a current navigation position in the list, which distance corresponds to a remaining duration of the criterion, wherein a program with content fulfilling a temporally limited criterion is a program containing a block of commercials and the program is positioned at a distance from the current navigation position in the list until the block of commercials has ended.

9. A method as claimed in claim 1, or a receiver as claimed in claim 8, wherein the broadcast medium is television or radio.

* * * * *